United States Patent Office 3,220,959
Patented Nov. 30, 1965

3,220,959
PROCESS FOR PRODUCING A POLYMERIZATION CATALYST
Adam Orzechowski, Waltham, Mass., assignor to Cabot Corporation, Boston, Mass., a corporation of Delaware
No Drawing. Filed Mar. 8, 1963, Ser. No. 263,688
14 Claims. (Cl. 252—441)

This invention relates to polymerization catalysts and in particular to a process for producing polymerization catalyst components.

A copending application, Serial No. 197,231, filed May 24, 1962, by Yancey and MacKenzie, now abandoned, discloses a process for producing novel ion exchange materials by reacting an alkali metal or certain alkali metal compounds with hydroxyl groups on the surface of a metal oxide.

It has also been disclosed, for example, in copending U.S. patent applications Serial No. 2,861, filed January 18, 1960, and Serial No. 21,110, filed April 11, 1960, both by Orzechowski and MacKenzie, both now abandoned, that inorganic solids bearing chemically combined on the surface thereof, surface structures comprising

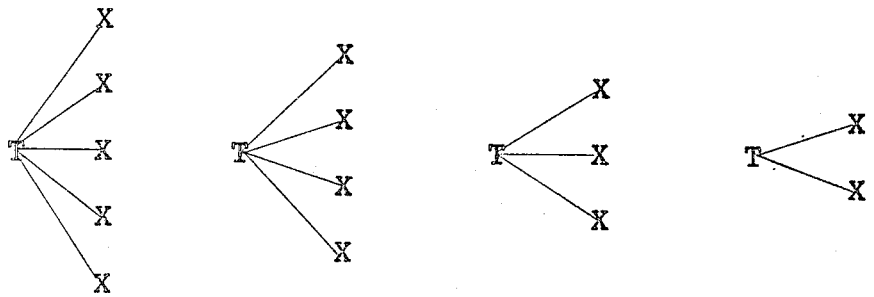

wherein T is a metal chosen from the group consisting of the metals of Groups IVa, Va and VIa; each X is any halogen; and where said structures are linked directly from T to at least one oxygen atom on the surface of the inorganic solid, comprise superior catalyst components.

In accordance with said patent applications of Orzechowski and MacKenzie, said catalyst components are produced by reacting a halide type compound of a Group IVa, Va or VIa metal with hydroxyl groups on the surface of a finely-divided inorganic solid as is illustrated in the following equation in which titanium tetrachloride represents the halide type compound and silica, the inorganic solid bearing hydroxyl groups on the surface thereof:

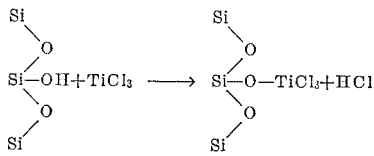

In said method of making said catalyst components, the gaseous by-product of the above reaction, i.e. hydrogen halide, should be removed from the reaction medium in order to produce a catalyst component of reproducible character and performance. Secondly, the kinetics of the above reaction are such that considerable time and heat energy are normally required in the efficient formation of said catalyst component. In accordance with the present invention, however, by-products which need be removed are not produced and formation of said catalyst components are normally more readily achieved.

Accordingly, it is a principal object of the present invention to provide a novel process for producing said polymerization catalyst components.

It is another object of the present invention to provide an improved process for producing said polymerization catalyst components, which process does not involve the removal of by-products of the reaction from the reaction medium.

Other objects of the present invention will in part be obvious and will in part appear hereinafter.

It has been discovered that excellent catalyst components are produced in a relatively short time by reacting (a) catalyst component intermediates comprising the reaction product produced by reacting, as disclosed in detail in U.S. Serial No. 197,231, hydroxyl groups on the surface of a finely-divided inorganic metal oxide having at least about $1 \times 10^{-4}$ equivalents per gram of hydroxyl groups on the surface thereof, and an alkali metal or certain alkali metal compounds with (b) a halide-type compound of a Group IVa, Va or VIa metal.

Inorganic metal oxides suitable for the purposes of the present invention generally include any inert metal or metalloid oxide having hydroxyl groups on the surface thereof. For example, metal oxides such as titania, zirconia, thoria and magnesia, and metalloid oxides such as silica are all generally suitable for the purposes of the present invention. It should be noted, that for the sake of brevity, only the term, "metal oxide," is used hereinafter in the specification and appended claims but it is intended, and thus it should be understood, that the term, "metal oxides," includes "metalloid oxides."

The alkali metals, by which is meant lithium, sodium, potassium, rubidium, cesium and francium, in metallic form are all generally suitable for the purposes of the present invention. In addition, alkali metal compounds conforming to the empirical formula

MR wherein M is an alkali metal and R is chosen from the group consisting of any monovalent hydrocarbon and hydride radical are suitable for the purposes of the present invention.

Specific examples of R groups for substitution in the above formula include methyl, ethyl, n-propyl, isobutyl, n-amyl, isoamyl, hexyl, n-octyl, n-dodecyl, and the like; 2-butenyl, 2-methyl-2-butenyl, and the like; cyclopentylmethyl, cyclohexylethyl, cyclopentylethyl, methylcyclopentylethyl, 4-cyclohexenylethyl and the like; 2-phenylethyl, 2-phenylpropyl, α-naphthylethyl, methylnaphthylethyl, and the like; cyclopentyl, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenylcyclopentyl, phenylcyclohexyl, and the corresponding naphthyl derivatives of cycloalkyl groups, and the like; phenyl, tolyl, xylyl, ethylphenyl, xenyl, naphthyl, methylnaphthyl, dimethylnaphthyl, ethylnaphthyl, and cyclohexylphenyl.

Examples of compounds conforming to the above formula, and which are therefore suitable for the purposes of the present invention, are ethyllithium, hexyllithium, cyclopentadienylsodium, octylpotassium, butyllithium, sodium hydride, cesium hydride and rubidium hydride. Moreover, complexed compounds which conform to the above empirical formula, such as diphenyldilithium and diphenylpotassium lithium are also generally suitable for the purposes of the present invention.

The conditions under which reaction between the alkali metal or alkali metal compound and hydroxyl groups on the surface of the finely-divided metal oxide can be accomplished in order to produce said catalyst component intermediate are subject to considerable variation. However, in order to obtain a catalyst component intermediate with reproducible character and performance, it has been found to be all important that the finely-divided metal oxide be essentially dry and anhydrous (i.e. free of molecular water in any form) at the time it is brought into contact with the alkali metal or alkali metal compound. When the finely-divided metal oxide to be utilized contains molecular water in any form and/or tends to absorb same on exposure to humid atmospheres, etc., it must be dried immediately before use, or after drying must be maintained continuously out of contact with water vapor until utilized. If the precaution of using a substantially anhydrous finely-divided metal oxide is not observed, the desired chemical reaction either does not ocur at all or does not predominate to the extent necessary to produce a superior catalyst component intermediate. Instead, products are obtained which are very inferior as catalyst component intermediates in that the concentration of alkali metal present on the surface of the particulate metal oxides is reduced due to reaction of the alkali metal or alkali metal compound with moisture.

In the case of the alkali metal compounds conforming to the formula MR, the reaction is preferably accomplished by contacting the finely-divided metal oxide with a solution or a good dispersion of the alkali metal compound in an inert hydrocarbon reaction medium, and maintaining the two reactants in intimate contact for a period of time sufficient to effect the desired metathetical chemical reaction resulting in the chemical bonding of the alkali metal to the finely-divided metal oxide. The length of time required to effect a given amount of such reaction and chemical bonding is largely dependent upon the temperature of the reaction mixture.

Generally speaking, any temperature between about −10° C. and about 125° C. can be used satisfactorily, but room temperature or higher will generally be used. Assuming provision is made for intimate contact of the dry, finely-divided metal oxide and the alkali metal compound, the minimum time required to accomplish the chemical reaction needed will vary from periods of about one minute at temperatures of about 125° C. or higher, to periods of about five minutes at temperatures of about 10–20° C. Temperatures substantially higher than about 125° C., e.g. 150–175° C., often cause the decomposition of alkali metal compounds and moreover are completely needless, and therefore of little or no interest.

Various classes of hydrocarbons or their mixtures which are liquid and substantially inert under the reaction conditions of the present process constitute suitable liquid reaction media. Thus, various classes of saturated hydrocarbons such as pure alkanes, cycloalkanes and commercially available mixtures, freed of harmful impurities, are suitable for the purposes of the present invention. For example, straight run naphthas and kerosenes, liquefied alkanes, aromatic hydrocarbons, and particularly the mononuclear aromatic hydrocarbons such as benzene, toluene, xylenes, mesitylene, and xylene-p-cymene mixtures and the like are all completely suitable. Also, ether-type solvents, such as 1,2-dimethoxyethane, and tetrahydrofuran dioxane are useful particularly in cases where the alkali metal compound is insoluble in a true hydrocarbon solvent. Thus, for the purposes of the present invention, ether-type solvents are included within the scope of the term, hydrocarbon solvents.

Although use of the alkali metal compounds in liquid or solution form generally gives excellent results, the reaction of the alkali metal compound with hydroxyl groups on the surface of the finely-divided metal oxide can also be effected if the latter is exposed to sufficient, quantities of the vapors of an alkali metal compound under conditions of time and temperature similar to those discussed above. The vapors of many alkali metal compounds can be supplied under their own vapor pressure using a partial vacuum if necessary, or with the aid of a dry, inert carrier gas such as nitrogen. Said vapor phase treatment can be accomplished in any suitable manner such as by circulating the vapors through the particulate oxide in a fixed, moving or fluidized bed reactor.

In the case of the alkali metals in metallic form, however, reaction with hydroxyl groups on the surface of the finely-divided metal oxide in a hydrocarbon solution is not generally feasible due to the very low solubility of the alkali metals in most hydrocarbon media. On the other hand, reaction of alkali metal vapors with the finely-divided metal oxide is not generally practicable due to the extremely low volatility of the alkali metals. The reaction of alkali metals with the finely-divided metal oxide can, however, be accomplished by reacting in an inert hydrocarbon medium (as specified above) a finely-divided metal oxide and finely comminuted alkali metal. Briefly, a suitable procedure for accomplishing said reaction comprises placing a finely-divided metal oxide and an alkali metal in a hydrocarbon solvent having a boiling point higher than the melting point of the alkali metal, melting the alkali metal by heating the hydrocarbon medium to a temperature above the melting point of the alkali metal but preferably below the boiling point of the hydrocarbon medium, and subsequently comminuting the molten alkali metal, for example, by stirring the hydrocarbon medium with a high speed stirrer. Under these conditions, the alkali metal will react with the hydroxyl groups on the surface of the metal oxide to produce the catalyst component intermediates of the present invention.

The accomplishment of an actual chemical reaction of controlled extent between hydroxyl groups on the surface of the finely-divided metal oxide and the alkali metals or alkali metal compounds is of utmost importance in obtaining catalyst component intermediates of reproducible character and performance because the ultimate catalytic activity of a catalyst component is generally highly dependent upon the amount of alkali metal chemically combined with a given weight of the finely-divided metal oxide. Accordingly, in preparing the surface reacted finely-divided metal oxides of the present invention, it should be kept in mind that the smaller the average particle size of the metal oxide and the larger the quantity of hydroxyl groups on the surface thereof, the greater will be the potential activity and efficiency of the catalyst component producible therefrom. Therefore, it is important to use as the starting material particulate, finely-divided metal oxides having an average particle diameter of less than about 1 micron, and preferably less than about 0.1 micron, and a substantial hydroxyl group content on the surface thereof.

Although the mechanism of the reaction between the alkali metals or alkali metal compounds and the metal oxide is not completely understood, it is known that the alkali metals and alkali metal compounds react with the hydroxyl groups on the surface of the metal oxide liberating by-products such as the corresponding alkane when an alkali metal alkyl is utilized, or hydrogen when an alkali metal or an alkali metal hydride is utilized. It is believed, although there is no intent to be bound by this explanation, that the reactions which occur are of the type illustrated by the following equations, wherein silica serves as the finely-divided metal oxide and sodium metal, sodium hydride and lithiumbutyl, respectively, serve as the alkali metal reactants:

Equation 1

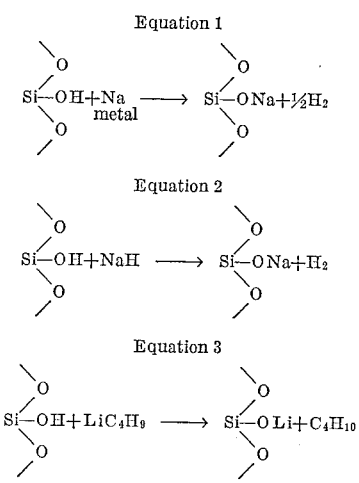

When said alkali metallated metal oxides are reacted with a halide type compound of a Group IVa, Va or VIa metal, catalyst components of the type disclosed in U.S. patent applications, Serial No. 2,861, and 21,110 are produced.

Halide-type compounds of Group IVa, Va or VIa (hereinafter generally referred to as transition metal halides) suitable for the purposes of the present invention are the compounds conforming to the general empirical formula $$TO_aX_b$$

wherein T is a metal chosen from the group consisting of the metals of Groups IVa, Va and VIa (where the group numbers correspond to the Mendeleev Periodic System); O is oxygen; $a$ is a number from 0 to 2; each X is any halogen; and $b$ is number from 1 to 6.

Examples of suitable compounds conforming to said general formula are halides such as zirconium tetrachloride, vanadium tetrachloride, and titanium tetraiodide, and oxyhalides such as chromium oxychloride and vanadium oxychloride.

The conditions under which reaction between the transition metal halide and the finely-divided, alkali metallated metal oxides can be accomplished are subject to considerable variation. However, as has been previously stated with regard to the formation of the alkali metallated oxide, in order to obtain a catalyst component with exceptionally high activity, and reproducible character and performance, it has been found to be all important that the finely-divided alkali metallated oxide be maintained essentially dry and anhydrous (i.e. free of molecular water in any form) prior to and at the time it is brought into contact with the transition metal halide. Generally, the said reaction can be carried out by contacting said alkali metallated oxide with said transition metal halide, preferably in a solution thereof in an inert hydrocarbon medium, and maintaining the two reactants in intimate contact for a period of time sufficient to effect the desired chemical reaction resulting in the chemical bonding of the transition metal to the metal oxide. The length of time required to effect a given amount of such reaction and chemical bonding is largely dependent upon the temperature of the reaction mixture. Generally speaking, almost any temperature between about −10° C. and about 200° C., and even higher temperature can be used satisfactorily, but room temperature to about 100° C. is generally preferred. Assuming provision is made for intimate contact of the alkali metallated oxide and the transition metal halide, the minimum time required to accomplish the chemical reaction will vary from periods of about one hour at about room temperature to periods of about five minutes at temperatures of 100° C. or over. Temperatures substantially higher than about 300° C., e.g. 500° C., are completely needless and therefore of little or no interest.

It is believed that the type of reaction that occurs is correctly illustrated by the following illustrative equation, wherein silica bearing chemically bound lithium on the surface thereof serves as the alkali metallated metal oxide and vanadium tetrachloride serves as the transition metal halide:

EQUATION 4

$$SiOLi + VCl_4 \rightarrow SiOVCl_3 + LiCl$$

There follow a number of non-limiting examples:

*Example 1*

To a 2000 milliliter, three neck, glass reaction vessel equipped with a stirrer and condenser, there is added 20 grams of "Cab-O-Sil," a pyrogenic silica produced by Cabot Corporation, which has an average particle diameter of about 10 millimicrons and a hydroxyl group content on the surface thereof of about 1.5 milliequivalents/gram and 1500 milliliters commercial grade n-heptane. The resulting slurry is then continuously stirred and azeotropically dried for a period of 12 hours during which time about 500 milliliters of a water/n-heptane azeotrope are distilled from the vessel. Next, there is added to said vessel about 25 millimoles of butyllithium dissolved in 250 milliliters anhydrous n-heptane. The vessel is then continuously stirred at ambient temperature for a period of 15 minutes. Subsequently, the extent of the reaction between the butyllithium and hydroxyl groups on the surface of the silica is determined by analyzing the liquid contents of the vessel to insure the absence therein of butyllithium, and the said silica is found to have about 25 milliequivalents of lithium chemically bound to the surface thereof. Next, about 20 millimoles of titanium tetrachloride dissolved in 250 milliliters anhydrous n-heptane is added dropwise to the alkali metallated silica slurry with continuous stirring at about 50° C. After about 30 minutes, the extent of the reaction between the titanium tetrachloride and the alkali metallated silica is determined by testing the liquid contents of the vessel for the absence therein of titanium tetrachloride and by analyzing the solid contents of the vessel for lithium chloride and the said silica is found to have 20 milliatoms of titanium chemically bound to the surface thereof. 75 milliliters of this slurry containing about 1 gram of silica to which there is chemically bound about 1 milliatom of titanium is then transferred from this reaction vessel to a one-gallon stainless steel autoclave, equipped with a stirrer and previously flushed with dry nitrogen. Next, about 1900 milliliters of anhydrous n-heptane and about one millimole triisobutylaluminum are introduced into said autoclave and the autoclave is then continuously agitated and heated to, and maintained at, about 80° C. After about five minutes, ethylene gas is introduced into said vessel to a total pressure of about 200 p.s.i.g. and said pressure is then maintained for one hour by periodic introduction, as needed, of additional ethylene gas. Upon examination of the products of the reaction, it is found that about 500 grams solid polyethylene has been produced.

*Example 2*

This example is essentially a duplicate of Example 1, with the exception that in this example azeotropic distillation of the silica/commercial grade n-heptane slurry is not carried out. 30 minutes after the addition of the titanium tetrachloride as described in Example 1 the silica is analyzed and it is found that there is no titanium chemically bound to the surface thereof.

*Example 3*

To a 500 milliliter flask there is charged 50 grams of "Alon," a pyrogenic alumina produced by Deutsche Gold- und Silber-Scheideanstalt vormals Roessler which has an average particle diameter of about 10–40 millimicrons and a hydroxyl group content on the surface thereof of about 0.7 milliequivalent per gram. Said flask is then placed in a vacuum oven and heated to, and maintained at, a temperature of about 150° C. for 12 hours. Next, the alumina is transferred, without exposure to the atmosphere, to the bowl of a Waring Blendor equipped with a heating mantle and enclosed in a dry nitrogen atmosphere. 500 milliliters anhydrous toluene and about 25 millimoles of metallic potassium are then charged to said bowl and the bowl is then heated to and maintained at about 80° C. while the gases evolved during the reaction are continuously eliminated by a flow of dry nitrogen. The molten potassium is then comminuted by the action of the Waring Blendor and the reaction is allowed to continue for about 15 minutes. After cooling, the extent of reaction between the potassium and hydroxyl groups on the surface of the alumina is determined by determining the quantity of hydrogen gas evolved from the reaction mixture and by analyzing the liquid contents of the vessel for potassium and said alumina is found to have about 25 milliatoms of potassium chemically bound to the surface thereof. Said slurry is thereafter transferred, again without exposure to the atmosphere, to a 1000 milliliter three neck glass reaction flask equipped with a stirrer. Next, about 20 millimoles vanadium oxychloride is added to said flask dropwise and with continuous stirring over a period of about 30 minutes while the temperature of the mixture is maintained at about 55° C. Subsequently, the extent of the reaction between the vanadium oxychloride and the alkali metalated alumina is determined by analyzing the liquid contents of the reaction vessel to insure the absence therein of vanadium oxychloride and analysis of the solid contents of the reaction vessel for potassium chloride and it is found that about 20 milliequivalents of vanadium are chemically bound to the surface of the alumina. The vanadated alumina produced in accordance with the present example is thereafter found to be an efficient polymerization catalyst component.

Obviously, many changes may be made in the above-described examples and procedure without departing from the scope of the present invention. Thus, for example, the catalyst components of the present invention in addition to being treated with an organometallic compound such as triisobutylaluminum as in Example 1, can be subjected to ultraviolet radiation or reacted with a silane such as trimethoxysilane in order to produce catalytically active products useful as catalysts for polymerization. Also, for example, although only titanium tetrachloride and vanadium oxychloride are mentioned in the above examples, other transition metal halides, as set forth above in detail are also suitable. For example, titanium tetraiodide, zirconium tetrachloride and chromium oxychloride are also entirely suitable.

Also, although only an alkali metal and an alkali metal alkyl are specifically mentioned in the above examples, alkali metal hydrides (i.e. lithium hydride, potassium hydride, cesium hydride, etc.) are also suitable for the purposes of the present invention.

Accordingly, it is intended that the above disclosure be regarded as illustrative and as in no way limiting the scope of the invention.

What I claim is:

1. A process for producing a polymerization catalyst component which comprises reacting (a) a finely-divided metal oxide having an average particle diameter of less than about 0.1 micron and bearing in chemical combination on the surface thereof at least about $1 \times 10^{-4}$ equivalents per gram of alkali metal which is linked directly to an oxygen atom in the surface of said oxide, and (b) a compound conforming to the formula:

$$TO_aX_b$$

wherein T is a metal chosen from the group consisting of the metals of Groups IVa, Va and VIa; O is oxygen; $a$ is a number from 0 to 2; each X is any halogen; and $b$ is a number from 1 to 6.

2. The process of claim 1 wherein said alkali metal chemically bound to the surface of said metal oxide is lithium.

3. The process of claim 1 wherein said alkali metal chemically bound to the surface of said metal oxide is sodium.

4. The process of claim 1 wherein said alkali metal chemically bound to the surface of said metal oxide is potassium.

5. The process of claim wherein said metal oxide is chosen from the group consisting of alumina and silica.

6. The process of claim 1 wherein said metal oxide is silica.

7. The process of claim 1 wherein said metal oxide is alumina.

8. The process of claim 1 wherein in said formula:

$$TO_aX_b$$

T is a metal of Group IVa.

9. The process of claim 1 wherein in said formula:

$$TO_aX_b$$

T is titanium.

10. The process of claim 1 wherein said compound conforming to the formula:

$$TO_aX_b$$

is titanium tetrachloride.

11. The process of claim 1 wherein in said formula:

$$TO_aX_b$$

T is a metal of Group Va.

12. The process of claim 1 wherein in said formula:

$$TO_aX_b$$

T is vanadium.

13. The process of claim 1 wherein in said formula:

$$TO_aX_b$$

T is a metal of Group VIa.

14. The process of claim 1 wherein in said formula:

$$TO_aX_b$$

each X is chlorine.

References Cited by the Examiner

UNITED STATES PATENTS

| | | | |
|---|---|---|---|
| 2,691,647 | 10/1954 | Field et al. | 252—467 |
| 2,909,512 | 10/1959 | Bruce | 252—431 X |
| 3,166,541 | 1/1965 | Orzechowski et al. | 252—441 X |
| 3,166,542 | 1/1965 | Orzechowski et al. | 252—442 X |

BENJAMIN HENKIN, *Primary Examiner.*

MAURICE A. BINRDISI, *Examiner.*